United States Patent Office 3,083,223
Patented Mar. 26, 1963

3,083,223
ESTERS OF BORON PHOSPHATE
Charles S. Wright, Crystal Lake, Ill., assignor to The Pure Oil Company, Chicago, Ill., a corporation of Ohio
No Drawing. Filed Dec. 23, 1959, Ser. No. 861,467
17 Claims. (Cl. 260—461)

This invention relates to esters of boron phosphate as new compositions of matter, and to the use of those soluble in hydrocarbons as additives in gasoline compositions to reduce spark-plug and other deposits in the combustion area, mitigate the deleterious effects of such deposits, reduce octane-requirement increases, and increase the life of the exhaust valve.

Modern, high-compression engines require fuels which are much superior to those in use only a few years ago. Modern, so-called premium gasolines are specially compounded to utilize hydrocarbon components and fractions having high octane numbers and are usually formulated with lead tetraethyl, or other anti-knock additives, to produce fuel compositions having high octane ratings. Many of the additives which are now used in modern gasoline compositions contribute to the formation of deposits in gasoline engines which result in uncontrolled combustion, octane-requirement increase, and spark-plug fouling. To combat these undesirable effects, a variety of other additives have been used in gasolines for the purpose of decreasing the frequency and/or severity of uncontrolled combustions, and spark-plug fouling. However, such a wide variety of undesired conditions are involved that even though a number of different additives have previously been used, the results are still short of the requirements for high-compression engines.

In accordance with this invention, I have found that esters of "boron phosphate" (boron phosphoric oxide; boric phosphoric oxide) can be prepared, and that some of these esters, as well as the ether formed as a by-product, are surprisingly soluble in gasoline. Also, in accordance with this invention, I have found that the reaction product, after it has been freed of water formed as a by-product of the reaction of boron phosphate and an alcohol, when dissolved in a gasoline suppresses uncontrolled combustions, increases spark-plug life, decreases combustion-chamber deposits, and exhibits antiwear properties. The compound "boron phosphate" is known as a chemically-inert, stable, water-insoluble compound. The esters of boron phosphate are, however, new, distinctive, and useful, and it is entirely unexpected that they should exhibit the unusual properties found.

Accordingly, it becomes a primary object of this invention to provide a superior gasoline composition by incorporating therein a small amount of a hydrocarbon-soluble ester of boron phosphate.

Another object of this invention is to provide new compositions of matter comprising esters of boron phosphate.

Other objects of this invention will become apparent or will be described as the specification thereon proceeds.

In order to illustrate the invention, the following examples are given:

EXAMPLE I

Equal portions of phosphorus pentoxide ($P_2O_5$) and boric oxide ($B_2O_3$) were heated together in a muffle furnace at 1800° F. according to established procedures. Unreacted material was removed from the product by washing with water until the effluent was no longer acidic, and the remaining water-insoluble white powder comprising boron phosphate was dried at 400° F. for 4 hours. Subsequently, the boron phosphate product was heated with various mono- and dihydric alcohols at the reflux temperature of the alcohols, and esterification was evidenced by the production of water with the corresponding consumption of the boron phosphate.

The fact of the reaction of phosphorus pentoxide and the boric oxide to form boron phosphate is evidenced by the following observations. Phosphorus pentoxide and boric oxide, and mixtures of the two, are soluble in water, whereas the reaction product after strong heating is insoluble in water and any unreacted phosphorus pentoxide or boric oxide can be washed therefrom with water. This insolubility in water and complete non-reactivity with water would indicate little or no reactivity with alcohols, contrary to the discovery described in this invention. I have found that boron phosphate reacts with monohydric or polyhydric alcohols to form esters, that some of these ester reaction products are soluble in hydrocarbons, such as gasoline, and that the esters, when incorporated in motor fuels for internal combustion engines, reduce combustion-chamber deposits, improve combustion of the fuel, and improve the performance of the engine.

The structure of boron phosphate has not been firmly established. Schulze, Z., Phys. Chem., 24B, 215 (1934), determined the crystal structure of $PBO_4$. It is not molecular, so no simple molecular formula indicates the $BPO_4$ structure. Although this invention is not to be limited to any speculations or theories as to the structure or reaction mechanism of the foregoing, it appears reasonable to assume the following structural formula for boron phosphate, for the purpose of representing its reactions with alcohols:

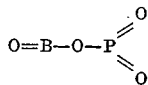

However, the non-structural formula usually seen in the literature for boron phosphate is $BPO_4$. Since it has been found that water is a product of the reaction of boron phosphate with alcohols, and the hydrogen of the water must come from the hydroxyl group of the alcohol, it is reasonble to assume that one or more of the reactions to form an ester represented by the following equations is taking place.

(I) $2ROH + OBOPO_2 \rightarrow OBOPO(OR)_2 + H_2O$
(II) $2ROH + OBOPO_2 \rightarrow (RO)_2BOPO_2 + H_2O$
(III) $4ROH + OBOPO_2 \rightarrow (RO)_2BOPO(OR)_2 + 2H_2O$ Two additional possibilities are represented by the equations:

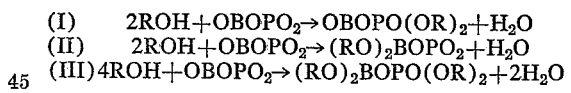
and
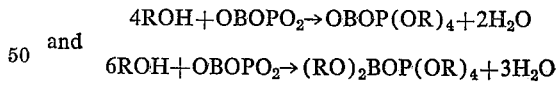

but since compounds containing four such groups attached to a phosphorus atom are rare, it is considered that formation of the esters represented by these two equations is highly improbable. Analyses have also shown that the ether corresponding to the alcohol is formed in a side-reaction, $2ROH \rightarrow ROR + H_2O$, and also appears in the crude product. In this reaction, two molecules of the alcohol condense to form one molecule of ether and eliminate one molecule of water.

Accordingly, the invention is directed to esters of boron phosphate represented by the general formula:

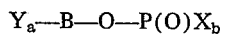

wherein Y may be oxygen or the alkoxy grouping RO—, $a$ is one when Y is oxygen, and $a$ is 2 when Y is an alkoxy group; X is oxygen or the alkoxy grouping RO—, and $b$ is 1 when X is oxygen and $b$ is 2 when X is the alkoxy group and Y and X are not both oxygen at the same time. The esters are formed by the reaction of at least 2 mols of an alcohol with 1 mol of boron phosphate, in which event esters may be formed wherein Y is oxygen, $a$ is one, X is alkoxy and $b$ is two, or Y is alkoxy and $a$ is two, and X is oxygen and $b$ is one. More complex esters may be formed by increasing the molar ratio of alcohol to boron phosphate, i.e., by using polyhydric instead of monohydric alcohols and/or by using an alcohol-to-boron-phosphate molar ratio of about 4 to 1, where the esters formed may be those in which Y is alkoxy and $a$ is two, and X is alkoxy and $b$ is two. As mentioned, those esters wherein four alkoxy groups are attached to the phosphorus are not considered to be probable products.

The R group in the foregoing equations and definitions represents a hydrocarbyl radical, such as aliphatic, alicyclic, and aromatic, or a heterocyclic radical such as furfuryl, pyridyl, pyrrl, quinonyl, pyrazoyl, etc. Non-limiting examples of alcohol reactants included in the scope of this invention are:

*Monohydric Alcohols*

Saturated monohydric—
  Methanol
  Ethanol
  Propanol
  Isopropanol
  Butanol
  t-Butanol
  Cyclohexanol
  Cyclopropanol
  Methylcyclohexanols
  Dimethylcyclohexanols
  Ethylcyclohexanols
  Propylcyclohexanols
  Butylcyclohexanols
  Amylcyclohexanols
  Phenylcyclohexanols
  Cyclobutanol
  Cyclopentanol
  Cycloheptanol
  Methylcyclopentanols
  2-ethylbutanol
  n-Hexanol
  n-Octanol
  n-Heptanol
  n-Pentanol
  n-Nonanol
  Secondary-butylcarbinol
  Isoamyl alcohol
  Neopentyl alcohol
  Pentanol-2
  Pentanol-3
  Methylisopropylcarbinol
  tert-Amyl alcohol
  Isohexyl alcohol
  2-ethylbutanol-1
  tert-Amylcarbinol
  Neopentylcarbinol
  2-methylpentanol-2
  Methyldiethylcarbinol
  Pentamethylethanol
  Capryl alcohol
  Hexanol-2
  Hexanol-3
  3-methylpentanol-2
  Ethylisopropylcarbinol
  Pinacolyl alcohol
  Lauryl alcohol
  Dimethylcyclopentanol
  Phenylcyclopentanol
  Diamylcyclohexanol
  Cetyl alcohol
  Stearyl alcohol
  Heptadecyl alcohol
  Alcohols prepared by the oxidation of petroleum hydrocarbons
  Alcohols prepared from complex polynuclear aromatics in solvent extracts by oxidation or chloromethylation and hydrolysis
  7-ethyl-2-methylundecanol-4
  Chlorostearyl alcohol
Unsaturated monohydric—
  Oleyl alcohol
  Cinnamyl alcohol
  Furyl alcohol
  Allyl alcohol
Dihydric alcohols or glycols—
  Ethylene glycol
  Propylene glycol
  Trimethylene glycol
  Butylene glycols
  Tetramethylene glycol
  1,5-pentandiol
  Pinacol
  2-methyl-2,4-pentanediol
  1,12-octadecandiol
  1-methylpropanediol-1,3
  2-methylpropanediol-1,3
  1,1-dimethylpropanediol-1,3
  1,2-dimethylpropanediol-1,3
  1,3-dimethylpropanediol-1,3
  2,2-dimethylpropanediol-1,3
  1,1,2-trimethylpropanediol-1,3
  1,2,3,3-tetramethylpropanediol-1,3
  Hexamethylpropanediol-1,3
  1,6-hexanediol
  1,7-heptanediol
  1,8-octanediol
  1,9-nonanediol
  1,10-decanediol
  1,12-dodecanediol
  1,6-heptanediol
  1,6-octanediol
  1,6-decanediol
  1,7-octanediol
  1,7-nonanediol
  1,7-decanediol
  1,7-dodecanediol
  1,8-nonanediol
  1,8-decanediol
  1,9-decanediol
  1,9-dodecanediol
  2,3-dimethyl-1,6-hexanediol
  3,4-diisopropyl-1,8-octanediol
  1,2-dihydroxybutane
  1,2-dihydroxypentane
  1,2-dihydroxyhexane
  1,2-dihydroxyheptane
  1,2-dihydroxyoctane
Polyhydric alcohols—
  Glycerol
  1,2,3-butanetriol
  1,1,1-trihydroxymethylethane
  Erythritol
  Pentaerythritol
  Pentahydric alcohols, e.g., arabitol and xylitol
  Hexahydric alcohols, e.g., mannitol, sorbitol, iditol, and dulcitol
  Heptahydric alcohols, e.g., perseitol and volemitol
  Cellobiitol
  Lactitol
  Melibiitol
  Maltitol
  Osides, e.g., methyl glucosides and ethyl glucosides
  Aldoses
  Betoses
Phenols, alkylphenols, substituted phenols, naphthols—
  p-Phenylphenol
  Alpha-naphthol
  Beta-naphthol
  Dibutylphenol
  t-Butylphenol Octylphenol
p-Chlorophenol
1-bromo-4-naphthol
Thymol
p-Cresol
Phenol
Benzylphenol
Xylenol
Methylhydroxydiphenyl
Alkoxyphenols:
    2,4,6-trimethoxyphenol
    2,4,6-triethoxyphenol
    2,4,6-tripropoxyphenol
    2,4,6-tributoxyphenol
    2,4,6-tripentoxyphenol
    2,4-dimethoxy-6-butoxyphenol
    2,4-dimethoxy-6-pentoxyphenol
    2,4-dimethoxy-6-hexoxyphenol
    4-ethoxyphenol
    4-methoxyphenol
p-Ethylphenol
    p-Isopropylphenol
    2-chloro-4-methylphenol One feature of this invention consists of a new and improved gasoline composition produced by incorporating in the gasoline an additive consisting of the gasoline-soluble esters of "boron phosphate." The additive is incorporated in the gasoline in a concentration varying from about 0.0001 to 0.5% of phosphorus (as the ester), with a concentration of 0.001 to 0.1% being preferred, and 0.1 to 0.6 theory being still more preferable. For application as a motor fuel additive, esters of monohydric alcohols or phenols are preferred, said alcohol containing from 1 to 12 carbon atoms. Gasoline compositions prepared using the esters of boron phosphate in accordance with this invention have anti-wear properties, substantially reduced tendency toward accumulation of combustion-area deposits, including spark plugs, and exhibit in addition reduction of the deleterious effects of engine deposits.

The esters of boron phosphate of this invention may be used with gasolines containing no other additives. However, the principal commercial use of the esters of this invention is in leaded gasoline compositions. The term "leaded" gasoline composition is used herein in the generally-accepted technical and commercial sense, that is, a gasoline containing lead tetraethyl and a scavenger, such as ethylene dibromide, ethylene dichloride, or mixtures thereof. A "premium" leaded gasoline may be used as a base fuel for the gasoline compositions of this invention and consists of a blend of gasoline components from one or more of the following processes: straight distillation of crude oil, catalytic cracking, thermal cracking, isomerization, alkylation, polymerization, reforming, hydrogenation, and the like. For example, a blend of 80% by vol. of gasoline from the fluid catalytic cracking process and 20 volume percent of gasoline-range alkylate may be used. To prepare a typical "premium" gasoline, there is added to a blended gasoline 1.0 to 3.5 ml. per gallon if commercial tetraethyl lead fluid (a typical composition being 61.48 wt. percent of tetraethyl lead, 17.86 wt. percent ethylene dibromide, 18.81 wt. percent of ethylene dichloride, and 1.85 wt. percent kerosine, dye and impurities); 1 to 10 lbs./1000 barrels of oxidation inhibitor, e.g., alkylphenylenediamines and alkylaminophenols, such as N-n-butyl-p-aminophenol; 0.25–0.5 lb./1000 barrels of a metal deactivator, e.g., a salicylidene propylenediamine, such as N,N'-disalicylidene-1,2-propylenediamine; 0.05–0.5 lb./100 barrels of a corrosion inhibitor; 25–50 lbs./1000 barrels of an anti-wear agent; and 1% of an anti-icer. The corrosion inhibitor may be a t-amine salt of carboxylic acid, such as the imidazoline salt of polymerized linoleic acid, in an aromatic solvent. The anti-wear agent may comprise esters of aromatic carboxylic acids, such as di-butyl phthalate. The anti-icer may comprise lower alcohols or mixtures of alcohols and ether, such as isopropanol, isopropanol-methanol mixture, isopropanol-isopropyl ether mixtures, and the like. The esters of boron phosphate of this invention may be used with gasolines which do not contain the above additives or with gasolines which contain any or all of the additives in any combination.

In order to illustrate the invention, the following specific examples are given.

EXAMPLE II

Four hundred g. (3.1 mols) of n-octyl alcohol were reacted with 50 g. (0.47 mol) of the reaction product of 1.0 mol of phosphorus pentoxide and 1.0 mol of boric oxide which had been heated in a muffle furnace at 1800° F. as described in Example I. The reaction mixture was refluxed at a temperature of 372–410° F. The reaction product was freed of water and contained octyl esters of boron phosphate, and dioctyl ether. Unreacted n-octyl alcohol and a major part of the dioctyl ether were removed from the crude product by vacuum distillation, leaving a residue consisting of the octyl ester in solution in the remaining ether. This product was an oily, pale-amber liquid, and was found to be miscible with hexane in all proportions. Upon combustion, this product produced an ash of 15 wt. percent.

A motor-fuel blend of 0% benzene and 40% light FCC gasoline was prepared, containing 3 ml./gal. of lead tetraethyl fluid. This blend, because of its aromatic and olefin content, qualified as a "dirty" fuel, one known to contribute to "rumble" in high-compression engines. The deleterious tendencies of this fuel are caused by its own combustion characteristics, and the deposits that are laid down during its combustion. The octyl ester product (in solution in dioctyl ether) was added to 70 gallons of this fuel blend to yield a concentration of 0.0019% phosphorus (0.17 theory), and the resulting gasoline was used as the fuel in an engine with a compression ratio of 11 to 1. In making these tests, the following procedure was followed:

(1) The untreated fuel was rated for rumble by recording a curve of the engine noise at rumble frequency for various speeds from 1500 r.p.m. to 3000 r.p.m.

(2) The same untreated fuel was then used over a period of 18 hours to build an engine deposit and the rumble curve was again plotted on the same graph.

(3) The engine was then cleaned and the foregoing procedure was repeated with the same fuel containing the ester of boron phosphate of this invention.

(4) The rumble and deposits were markedly reduced by the presence of the ester of boron phosphate. Examination shown the spark plugs to be free from any deposit and only a dust of deposit was evident in the combustion chamber.

The ester products of this invention, sufficiently soluble in motor fuel to give a concentration of at least about 0.001% by weight of phosphorus, are suitable for making a motor fuel, but concentrations between about 0.002 and 0.006 weight percent phosphorus are preferred.

EXAMPLE III

Esters of boron phosphate other than the n-octyl ester were made from the following alcohols, glycols, and phenols:

iso-Octanol
    n-Decanol
    n-Dodecanol
    Benzyl alcohol
    2-ethyl-hexanol-1
    p-sec-Amyl phenol
    Ethylene glycol
    Polyethylene glycol
    Propylene glycol
    Dipropylene glycol Polypropylene glycol
1,3-butanediol
1,5-pentanediol
1,6-hexanediol
2-ethyl-1,3-hexanediol
Hexylene glycol In each of the preparations, 250 g. of the organic hydroxy compound were charged to a reaction vessel equipped with a reflux condenser, and with a cold-trap to condense and separate water evolved from the reaction. Fifty grams of boron phosphate were introduced, and the reaction mixture was heated to a temperature sufficiently high to initiate reaction as evidenced by the appearance of water, as a by-product, in the cold-trap.

With the alcohols and glycols used, the reaction temperature was the reflux temperature of the alcohol at atmospheric pressure, or a temperature in the range of about 160° to 210° C. With lower alcohols boiling below about 160° C. (at 760 mm.), superatmospheric pressure may be employed to bring the temperature of the reaction mixture to at least about 150° C. in order to have a substantial rate of reaction. However, lower temperatures of at least 100° C. (necessary to drive off water formed as a by-product) may be used if a slow rate of reaction is not objectionable. I have found that in general glycols react more rapidly than monohydric alcohols, and hence with glycols temperatures of about 100° to 160° C. are usually satisfactory. Phenols may require temperatures near the upper end of the range, but in any event temperatures above about 215° C. should not be used in order to avoid possible decomposition and/or polymerization of the hydroxy compound charged or of the products.

The boron phosphate esters made from the alcohols and phenol in the above list were clear, oily liquids ranging in color from amber to reddish. The boron phosphate esters made from the glycols were clear, viscous, oily liquids ranging in color from colorless to pale amber.

The solubility of the boron phosphate esters in hydrocarbons ranged from insoluble for the esters made from the glycols listed to complete miscibility for the esters made from the alcohols and phenol listed. It will be noted that the alkanols had eight to twelve carbon atoms, and I would expect lower alkanols of one to five carbon atoms would yield esters of lesser solubility in hydrocarbons. The ester of benzyl alcohol, and of p-sec-amyl phenol, were both highly soluble in hydrocarbons, and were most soluble in aromatic hydrocarbons.

The esters of boron phosphate are of interest in applications other than as additives to fuels to improve the combustion and performance of the fuel. For example, the glycol esters are of interest for incorporation in soluble oils and in fire-resistant hydraulic fluids where some degree of water solubility or tolerance to water, is generally desirable.

Other uses for the oil-soluble esters of this invention are additives for lubricants to confer or improve anti-wear properties, film strength, and extreme-pressure properties.

While the invention has been described fully and completely in relation to several preferred embodiments thereof, it is to be understood that within the scope of the appended claims this invention may be practiced otherwise than as specifically described.

The embodiment of the invention in which an exclusive property or privilege is claimed are defined as follows:

1. A compound selected from the esters of boron phosphate having the formula $Y_a$—B—O—P(O)$X_b$ where Y is selected from the group consisting of =O and —OR, $a$ being 1 when Y is =O and 2 when Y is —OR, X is selected from the group consisting of =O and —OR, $b$ being 1 when X is =O and 2 when X is —OR, at least one of the groups X and Y being —OR, wherein each of the groups —OR represents the residue of a member of the group consisting of alcohols, phenols, and polyols denoted by the formula R(OH)$_x$ where $x$ is 1 to 7.

2. A compound in accordance with claim 1 in which each of the groups —OR represents the residue of a member of the group consisting of alkanols, alkenols, cycloalkanols, arylalkanols, phenols, alkanediols, alkanetriols, alkanetetraols, alkanepentaols, alkanehexaols, and alkaneheptaols, containing up to about 30 carbon atoms.

3. A compound in accordance with claim 2 in which Y is oxygen and $a$ is equal to 1.

4. A compound in accordance with claim 2 in which Y is the group —OR and $a$ is equal to two.

5. A compound in accordance with claim 2 in which X is oxygen and $b$ is equal to one.

6. A compound in accordance with claim 2 in which X is the group —OR and $b$ is equal to two.

7. A compound in accordance with claim 2 in which —OR is the residue of a $C_1$-$C_{12}$ alcohol.

8. A compound in accordance with claim 2 in which —OR is the residue of a glycol.

9. A compound in accordance with claim 2 in which —OR is the residue of a phenol.

10. An octyl ester of boron phosphate.
11. A decyl ester of boron phosphate.
12. A benzyl ester of boron phosphate.
13. A glycol ester of boron phosphate.

14. The method of preparing esters of boron phosphates which comprises heating boron phosphate with a hydroxy compound selected from the group consisting of alcohols, phenols, and polyols containing up to seven hydroxy groups, at a temperature of about 100°–215° C. for a time sufficient to effect reaction and remove water of reaction.

15. A method in accordance with claim 14 in which the mol ratio of hydroxy compound to boron phosphate is at least two.

16. A method in accordance with claim 15 in which the hydroxy compound is an alcohol and the reaction is carried out under reflux conditions, and the ester is purified by distillation.

17. A method in accordance with claim 16 in which n-octyl alcohol is refluxed with boron phosphate.

References Cited in the file of this patent

UNITED STATES PATENTS

| | | |
|---|---|---|
| 2,583,549 | Daul et al. | Jan. 29, 1952 |
| 2,648,696 | Whetstone | Aug. 11, 1953 |
| 2,901,336 | Brown | Aug. 25, 1959 |
| 2,935,390 | Bartleson | May 3, 1960 |
| 3,047,607 | Thayer | July 31, 1962 |